Sheet 1.

Ellis Luther,
Horse-Rake

2 Sheets.

N° 74,922.      Patented Feb. 25, 1868.

Witnesses.
Charles D. Kellum.
William Fahy.

Inventor.
Ellis Luther

2 Sheets.  Sheet 2.

Ellis Luther,
Horse Rake.

No. 74,922. Patented Feb. 25, 1868.

Witnesses
Charles D. Kellum
William Fahy

Inventor
Ellis Luther

United States Patent Office.

ELLIS LUTHER, OF WEST TROY, NEW YORK.

Letters Patent No. 74,922, dated February 25, 1868.

---

IMPROVEMENT IN HORSE-RAKES.

---

The Schedule referred to in these Letters Patent and making part of the same.

---

TO ALL WHOM IT MAY CONCERN:

Be it known that I, ELLIS LUTHER, of West Troy, in the county of Albany, and State of New York, have invented certain new and useful Improvements in "Horse Hay-Rakes;" and I do hereby declare that the following is a full, clear, and exact description of the same, reference being hereby had to the accompanying drawings, which form and make a part of this specification.

Like letters represent and refer to like or corresponding parts.

Figure 1:
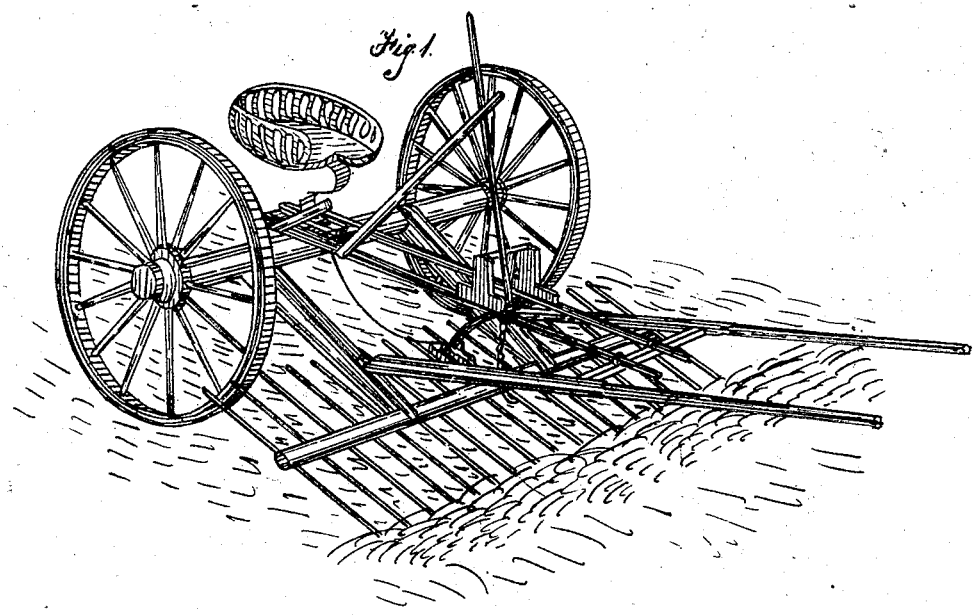
Figure 1 is a perspective view of a horse-rake containing my invention and improvements.
Figure 2:
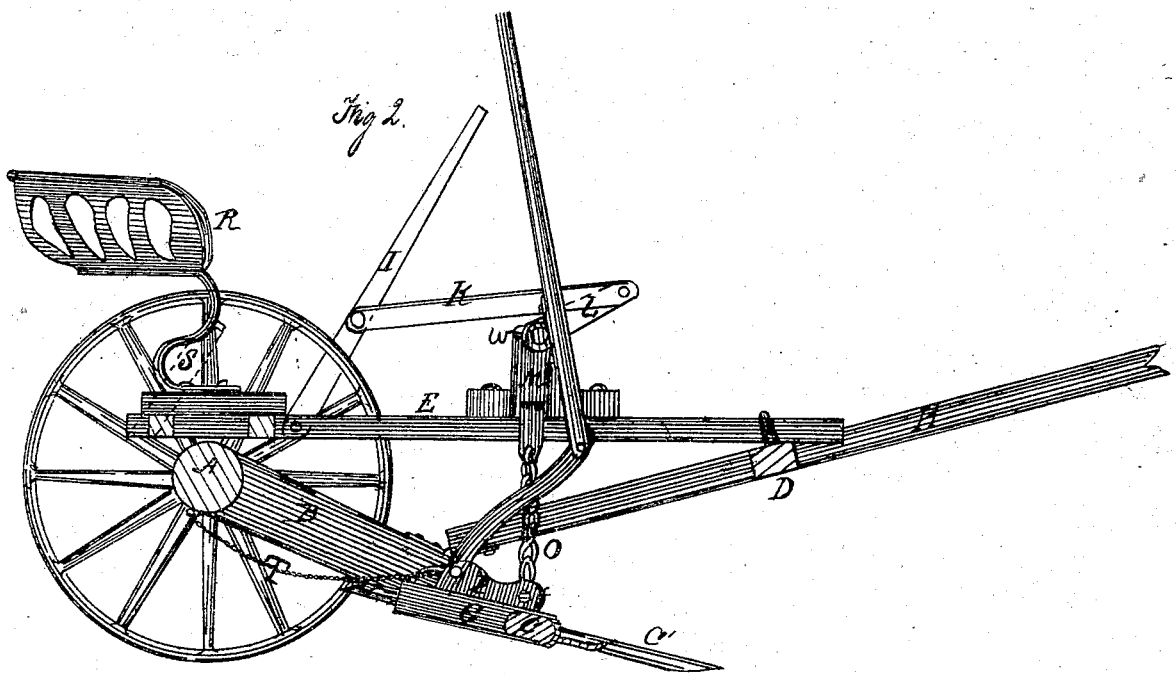
Figure 2 is a transverse section of said rake in its usual position when gathering the hay.
Figure 3:
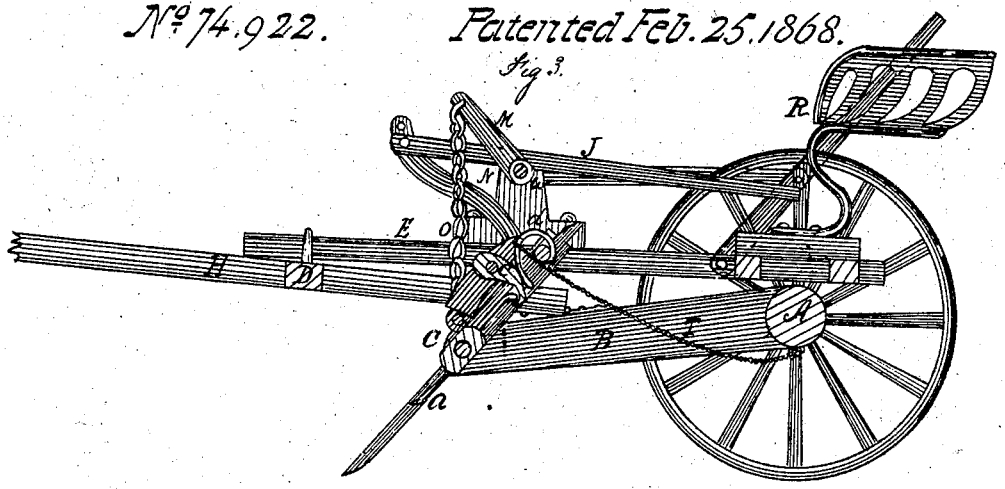
Figure 3 is another section of the same, in the act of making a revolution.
Figure 4:
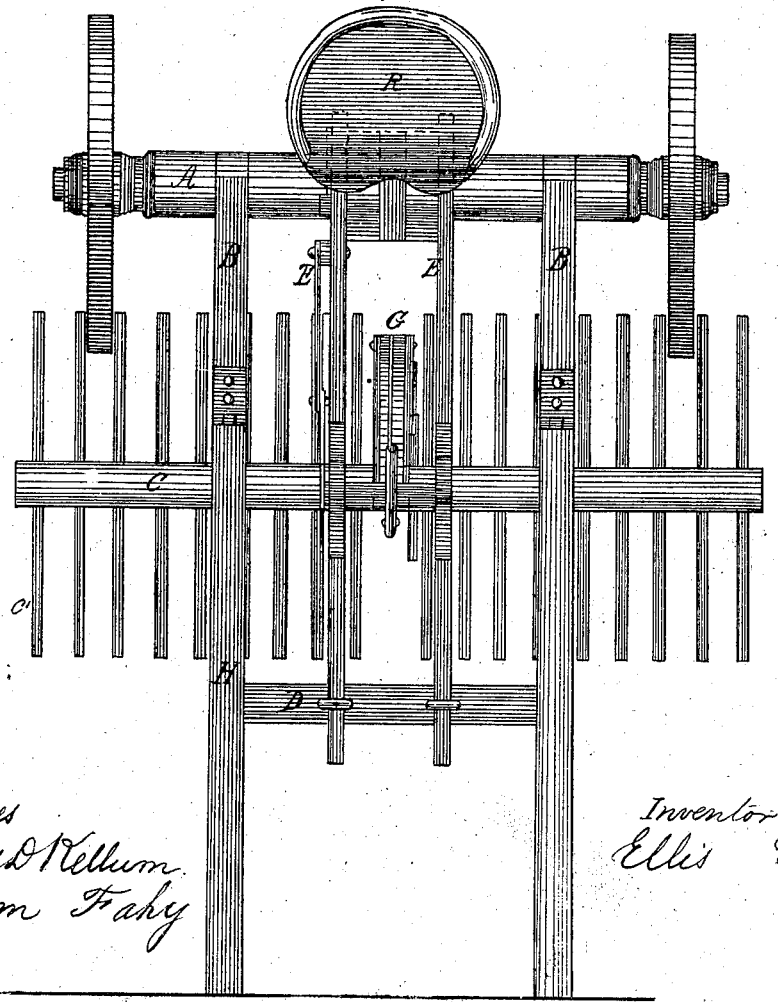
Figure 4 is a plan of the said rake, as seen from the top.

My invention relates to that species of horse-rake which is fitted with wheels and a driver's seat. Heretofore this kind of rake has been operated by a lever, attached to a beam above the rake-head, and crossing the same at right angles, to one end of which beam is suspended a cross-bar, and to the other a pair of diverging spring-bars. The cross-bar presses on the rear teeth of the rake, and prevents a revolution before the proper time, while the spring-bars press the front teeth into the ground, when it is desired to revolve the rake. There are two great defects in this mode of operation: Unless the lever or handle is at once drawn back, at the time of the revolution, the spring-bars are pressed into the ground and broken off, and this is almost sure to be done by inexperienced drivers. Again, the cross-bar, at the time of the revolution, is apt to catch a lock of hay, which either entangles the teeth or is wound around the rake-head, thus compelling the driver to frequently get down to unclog the rake.

My invention is intended to obviate these defects, and dispenses with the spring and cross-bars, employing in their place a device for lifting the rear part of the rake, so that the front teeth will catch in the ground and cause a revolution, which device is constructed and operated as follows:

A is the shaft or axle of the rake; B, the beams, reaching from the axle to the head of the rake; H, the shafts, between which the horse is fastened; E is a frame, resting upon the axle A and the cross-piece D; W is a rock-shaft, supported on uprights, placed upon the frame E, and to which is attached, at one end, the compound lever I K V, and at the middle, the lever J. The arm M is also rigidly attached to said rock-shaft W. G is a block, in the rear of the middle of the rake, and attached to the rake-head by a metal band, at C, which fits loosely, and permits the rake to revolve within it. P is a sort of cradle, attached to the upper surface of the block G, by screws through the bottom, and with the two sides connected by bolts or pivots at $e$ and $f$. $a$ and $a'$ are two hooked levers, inserted in the front and rear of the middle of the rake-head. $b$ is a dog, which rests on the upper part of the rear lever $a$, when the rake is in the usual position. $c$ is a hook, which engages with the lever $a$, in revolving the rake. Both $b$ and $c$ are attached to the pivot $e$. $d$ is a spring, which causes the hook $c$ to catch the end of the lever $a$. N is an arm, attached at one end to the rear part of the cradle P, and at the other end to the lever J. O is a chain, connecting the arm M with the front of said cradle P, by means of the pivot $f$, and used for lifting the rake from the ground, as hereinafter described. T is a cord, extending from the axle $a$ to the top of the dog $b$.

It will be seen that when the rake is drawn along in a horizontal position for the purpose of gathering the hay, the dog $b$ rests upon the hooked lever $a$, and keeps the rake from revolving, even if the teeth should accidentally catch in the ground.

When the driver desires to revolve the rake, he pulls the lever J towards him, thus raising the opposite end of the lever. The arm N is then raised, and with it the rear of the cradle P. The hook $c$ engages with the hooked lever $a$, and raises the rear part of the rake, while the cord T disengages the dog $b$ from the said lever $a$, and permits it to pass as the rake revolves. By means of this half revolution the front lever $a'$ strikes the end of the hook $c$, and presses it back enough to pass the spring $d$, keeping it in proper place. The dog $b$ then falls back to place, and the position is the same as before. When the driver desires to raise the whole rake from the ground, to avoid obstacles, or for other reasons, he pulls towards him the handle I of the compound lever I K V. This causes the rock-shaft W to perform a quarter revolution, which raises the arm M to a horizontal position, and by means of the chain *o* raises the front part of the cradle P, and with it, the whole rake from the ground.

Having thus described the nature of my said invention and improvements, what I claim, and desire to secure by Letters Patent of the United States, is—

1. The block G and cradle P, in combination with each other and with the head of the rake, substantially as hereinbefore described and set forth.

2. I also claim the combination of the dog *b* and the hook *c* with the cradle P, substantially as hereinbefore described and set forth.

3. I also claim the combination of the spring *d* with the hook *c*, substantially as herein specified and set forth.

4. I claim the combination of the arm N with the cradle P and the lever J, substantially as herein specified and set forth.

5. I claim the combination of the cord T with the dog *b* and axle A, substantially as herein specified and described.

6. I claim the lever J, the arm N, the cradle P, the hook *c*, the hooked lever *a*, and the spring *d*, all arranged and combined substantially as and for the purposes hereinbefore described and set forth.

7. I claim the combination of the cradle P with the chain *o*, substantially as hereinbefore stated and set forth.

In testimony whereof, I have hereunto set my hand, this 8th day of October, A. D. 1867.

ELLIS LUTHER.

Witnesses:
CHARLES D. KELLUM,
E. COWEN.